United States Patent [19]

Wenzel et al.

[11] Patent Number: 5,529,135
[45] Date of Patent: Jun. 25, 1996

[54] STEERING MECHANISM FOR FOUR WHEEL LAWN MOWER

[75] Inventors: Philip Wenzel, Vernon Center; David Giere, Canastota, both of N.Y.

[73] Assignee: Ferris Industries, Inc., Vernon, N.Y.

[21] Appl. No.: 241,130

[22] Filed: May 11, 1994

[51] Int. Cl.[6] .................................................. B62D 3/02
[52] U.S. Cl. ........................... 180/6.24; 180/400; 74/496
[58] Field of Search .................... 280/771, 98; 180/79.3, 180/79, 6.24, 6.26, 236; 74/496

[56] References Cited

U.S. PATENT DOCUMENTS

| | | | |
|---|---|---|---|
| 935,610 | 9/1909 | Mauksch | 74/496 |
| 2,453,417 | 11/1948 | Dufour | 180/6.24 |
| 2,863,518 | 12/1958 | Pellizzetti | 180/140 |
| 2,915,319 | 12/1959 | Kumler et al. | 280/91 |
| 3,154,162 | 10/1964 | McCaleb et al. | 180/6.66 |
| 3,528,682 | 9/1970 | Lohr et al. | 180/6.24 |
| 3,698,498 | 10/1972 | Stanford | 180/6.2 |
| 4,023,434 | 5/1977 | Axelsson | 280/771 |
| 4,154,314 | 5/1979 | Tsuji et al. | 180/6.2 |
| 4,353,284 | 10/1982 | Billottet et al. | 180/236 |
| 4,364,577 | 12/1982 | Tateyama et al. | 74/496 |
| 4,446,941 | 5/1984 | Laurich-Trost | 180/236 |
| 4,669,559 | 6/1987 | Fukui | 180/6.24 |
| 4,790,399 | 12/1988 | Middlesworth | 180/6.2 |
| 5,042,238 | 8/1991 | White, III et al. | 56/11.8 |

Primary Examiner—Paul N. Dickson
Attorney, Agent, or Firm—Harris Beach & Wilcox

[57] ABSTRACT

An improved riding lawn mower includes a vehicle frame having a front end, a rear end, and a rear motor deck that is secured to the rear end of the frame. A drive motor is mounted above the motor deck while a rear wheel assembly engaged with the motor, is connected to the bottom of the rear motor deck. The mower also includes a front wheel assembly connected to the front end of the vehicle frame. A vehicle body and driver's seat are attached to vehicle frame. A steering column is cooperatively connected at its lower end to the front wheel assembly and includes at its upper end, a steering wheel positioned within reach of the operator seated on the mower. A steering mechanism is linked between the lower end of the steering column and the front wheel assembly. The steering mechanism is positioned above the front wheels of the mower and turns the front wheels asynchronously so that the lawn mower can be driven along an arc path having a radius approximately half the length of the vehicle frame.

6 Claims, 5 Drawing Sheets

STEERING MECHANISM FOR FOUR WHEEL LAWN MOWER

BACKGROUND OF THE INVENTION

1. Field of the Invention

This invention relates in general to lawn mowers and, in particular, to riding lawn mowers. More specifically, but without restriction to the particular embodiment hereinafter described in accordance with the best mode of practice, this invention relates to an asynchronous steering mechanism for a riding lawn mower that allows the mower to be driven along an arc path having a radius approximately half the length of the mower frame.

2. Discussion of the Related Art

Riding lawn mowers typically include a frame or chassis, front and rear wheel assemblies, a drive motor commonly engaged with the rear wheel assembly to provide drive power thereto, a steering mechanism linked to the front wheel assembly, an operator's seat to place an operator of the mower within easy reach of the mower's controls, and lastly, a cutter assembly located either between the front and rear wheel assemblies or aft of the rear wheel assembly.

One of several important design considerations in such riding lawn mowers includes the turning radius of the vehicle. It is well understood that the turning radius of a riding lawn mower is a function of the combined capabilities of the mower's steering mechanism and front wheel assembly. Prior riding lawn mowers have typically included a rack and pinion steering mechanism such as that shown in U.S. Pat. No. 5,042,238 issued Aug. 27, 1991 to D. M. White, III, et al. This type of prior art rack and pinion steering mechanism includes a steering wheel connected to the upper end of a steering shaft which is downwardly directed through a tower to terminate with a toothed pinion at its lower end. The pinion is engaged with a toothed rack rotatably secured to the mower frame by a pivot rod. A tie rod is linked between the rear of the rack and each front wheel of the mower. This rack and pinion steering mechanism may be designed to provide asynchronous or "Ackerman" type steering in which the front wheel on the inside of the turn is rotated further than the front wheel on the outside of the turn. This allows the mower to be turned through tighter turns.

This type of rack and pinion steering system, however, is situated relatively low to ground level and is susceptible to becoming clogged with grass clippings and mud. In addition, the prior art rack and pinion steering system of the type described and discussed above, is subject to an increased risk of damage when employed in riding lawn mowers with a desired lower profile for vehicle stability.

OBJECTS AND SUMMARY OF THE INVENTION

It is, therefore, an object of the present invention to improve riding lawn mowers.

Another object of this invention is to improve steering mechanisms employed in riding lawn mowers.

It is a further object of the present invention to avoid debris from clogging the components of a steering mechanism for a riding lawn mower.

Still another object of the present invention is to locate the steering mechanism above the front wheels of a riding lawn mower to prevent damage to the mechanism during use of the mower.

It is still a further object of the present invention to locate the steering mechanism of a riding lawn mower above the front wheels of the mower to keep mud and cuttings from reaching and clogging the mechanism.

Yet another object of the present invention is to enable a riding lawn mower to be driven along an arc path having a radius approximately half the length of the mower frame.

An additional object of the present invention is to control the front wheels of a riding lawn mower so that the wheel on the inside of a turn will move through a greater angle than the wheel on the outside of the turn.

Yet a further object of the present invention is to enable a riding lawn mower to be maneuvered through tight turns so that lawn confined by different obstacles and barriers can be reached and cut by the mower.

These and other objects are attained in accordance with the present invention wherein there is provided an improved riding lawn mower. The present mover includes a vehicle frame having a front end, a rear end, and a rear motor deck that is secured to the rear end of the frame. A drive motor is mounted on above the motor deck while a rear wheel assembly engaged with the motor, is connected to the bottom of the rear motor deck. The rear wheel assembly includes rear wheels and a rear axle that provide drive capability to the lawn mower. The present riding lawn mower also includes a front wheel assembly connected to the front end of the vehicle frame. A vehicle body and driver's seat are attached to vehicle frame. A steering column is cooperatively connected at its lower end to the front wheel assembly and includes at its upper end, a steering wheel positioned within reach of the operator seated on the mower. According to one aspect of the present invention, a steering mechanism is linked between the lower end of the steering column and the front wheel assembly. This steering mechanism is positioned above the front wheels of the mower and turns the front wheels asynchronously so that the lawn mower can be driven along an arc path having a radius approximately half the length of the vehicle frame.

BRIEF DESCRIPTION OF THE DRAWING

Further objects of the present invention together with additional features contributing thereto and advantages accruing therefrom will be apparent from the following description of a preferred embodiment of the invention which is shown in the accompanying drawing with like reference numerals indicating like components throughout, wherein.

DETAILED DESCRIPTION OF A PREFERRED EMBODIMENT

Figure 1:
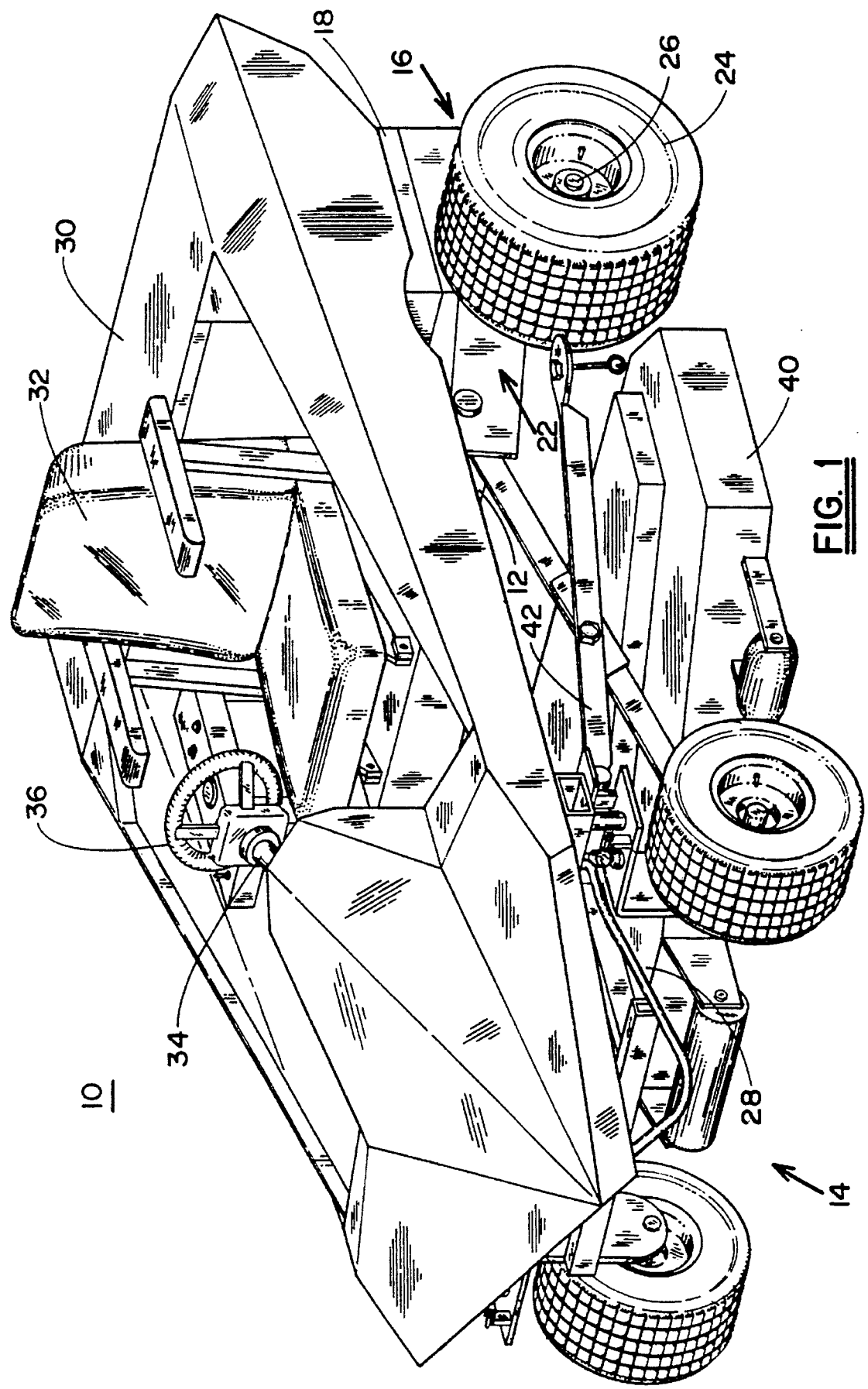
FIG. 1 is a perspective view of a riding lawn mower incorporating the steering mechanism of the present invention.
Figure 2:
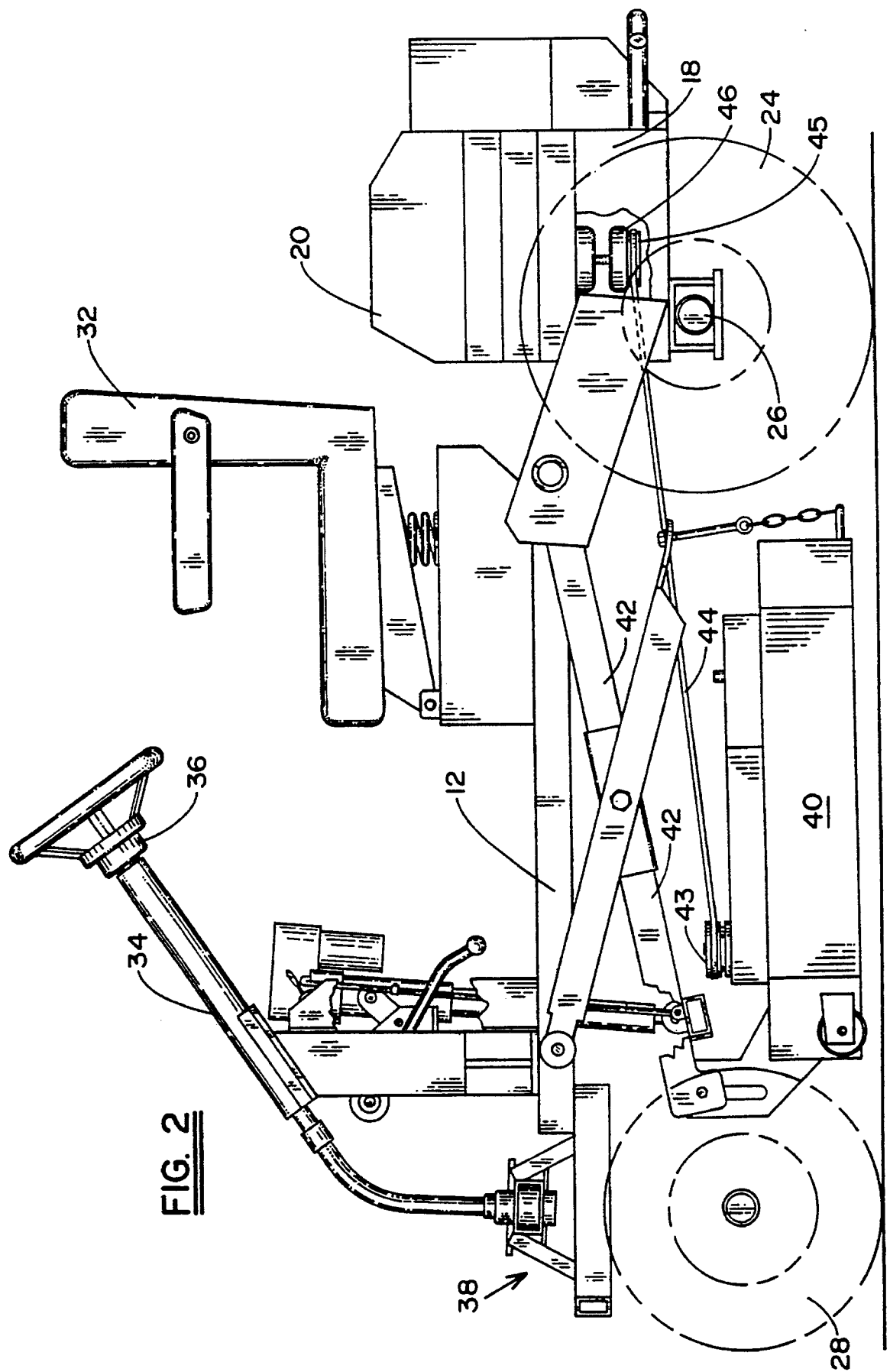
FIG. 2 is a side elevation view of the present riding lawn mower showing the mower in a cutting position.

Referring now to the drawing and initially to FIGS. 1 and 2, there is shown a riding lawn mower 10 in accordance with the present invention. The lawn mower 10 includes a vehicle frame generally referenced 12 that has a front end 14 and a rear end 16. The rear end 16 of the vehicle frame 12 includes a rear motor deck 18 which supports a drive motor 20 as shown in FIG. 2. The rear motor deck 18 also includes a rear wheel assembly 22 which includes a pair of rear wheels 24 secured to a rear axle 26. The front end 14 of the vehicle frame 12 includes a front wheel assembly 28 which will be described in further detail below. A vehicle body 30 is secured to the frame 12 and includes an operator seat 32 which is centrally located so that an operator seated therein may easily reach the controls of the lawn mower 10. A steering column 34 is positioned in front of the operator seat 32 and includes a steering wheel 36 which is in easy reach of an operator sitting in the seat 32. The lower end of the steering column 34 is linked to a steering mechanism 38. The riding lawn mower 10 is further provided with a mower cutter assembly 40 which includes cutter blades for performing the lawn cutting operation. The mower cutter assembly 40 is linked to a lifting mechanism 42 which moves the mower cutting assembly 40 between the cutting position shown in FIG. 2 and a fully retracted position close to the vehicle frame 12. The blades contained in the mower cutter assembly 40 are connected to a first drive pulley 43 which is connected to a drive belt 44 which in turn is connected to a second drive pulley 45 as shown in FIG. 2. The drive pulley 45 is connected to an electric clutch 46 which is engaged with an input shaft from the drive motor 20. The lifting mechanism 42 is fully disclosed in applicant's co-pending, commonly assigned application entitled "Vehicle Frame and Cutter Assembly Lifting Mechanism for Riding Lawn Mower", U.S. Ser. No. 08/258,325, now U.S. Pat. No. 5,433,006.

Figure 3:
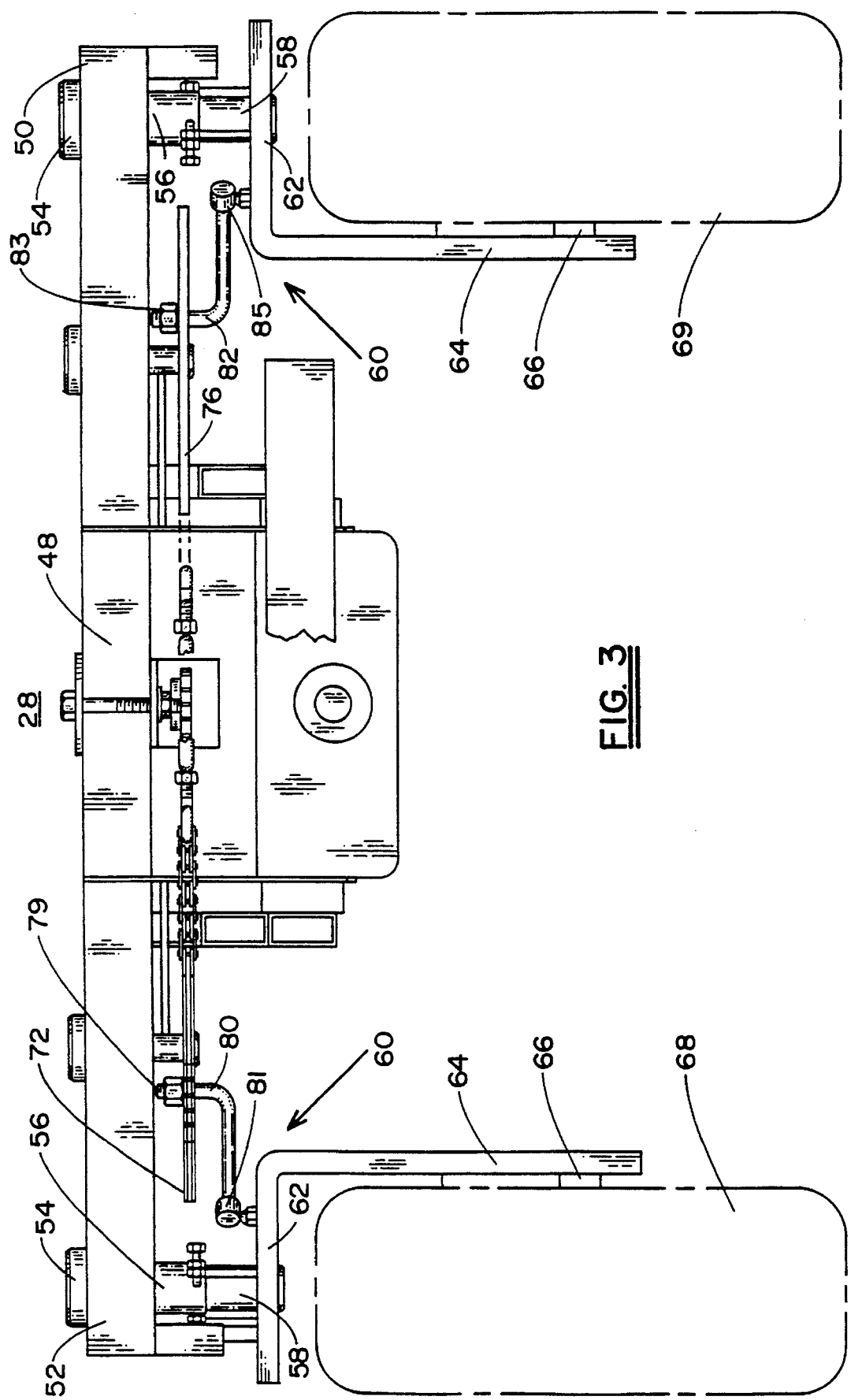
FIG. 3 is a front view of the mower steering mechanism according to the present invention.

With reference to FIG. 3, the front wheel assembly 28 will now be described in further detail. The front wheel assembly 28 includes a front connector bar 48 which has a left end 50 and a right end 52 with respect to an operator seated forward in the riding lawn mower 10. Each of the ends 50 and 52 of the front connector bar 48 includes a downwardly directed bearing cylinder 54. Each of the bearing cylinders 54 includes a first cylindrical member 56 which is rigidly secured to the connector bar 48. A second cylindrical member 58 is rotatably secured within each of the first cylindrical members 56. The lower end of each of the second cylindrical members 58 is secured to an L-shaped wheel bracket 60 which includes a horizontal base portion 62 and a downwardly directed leg portion 64 as shown in FIG. 3. A wheel axle 66 is outwardly directed from the lower end of the leg portion 64 of each of the L-shaped wheel brackets 60. One of the wheel axles 66 is rotatably secured to a front right wheel 68 while the other axle 66 is rotatably secured to a front left wheel 69. The vehicle steering assembly is thus comprised of the steering column 34, the steering wheel 36, and the steering mechanism 38.

Figure 4:
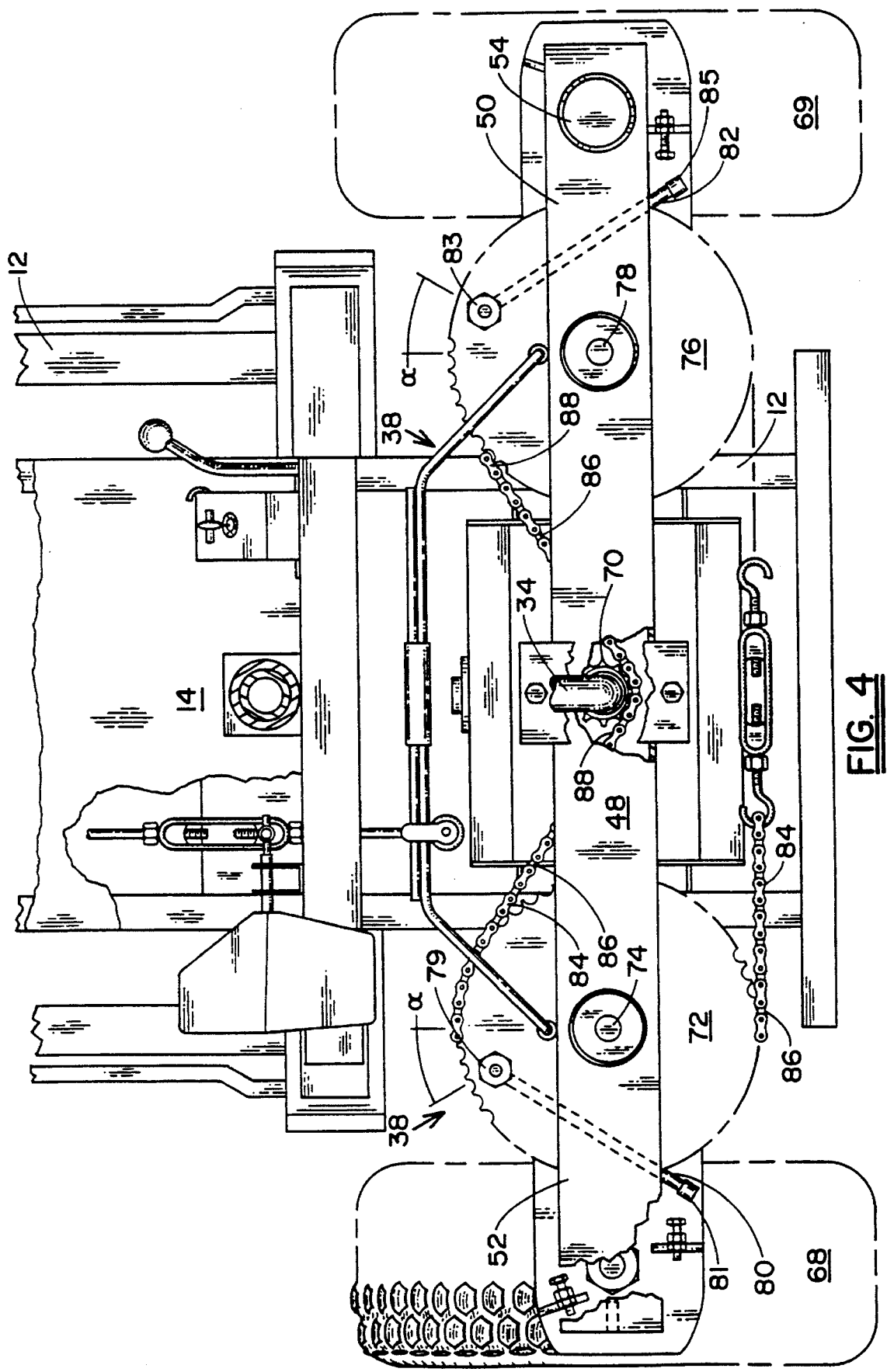
FIG. 4 is a plan view of the riding lawn mower steering mechanism illustrated in FIG. 3.

The steering assembly including the steering mechanism 38 is now described with reference to FIGS. 3 and 4 which show the front end 14 of the vehicle frame 12 and the front wheel assembly 28. As shown in FIG. 4, a portion of the vehicle frame 12 extends past the front connector bar 48. The front connector bar 48 is rigidly secured to the front end 14 and is positioned substantially perpendicular relative to the frame 12. Each end of the front connector 48 extends beyond the vehicle frame 12 as illustrated in FIG. 4. The steering mechanism 38 includes a center sprocket 70 which is rigidly secured to the lower end of the steering column 34. A first sprocket 72 is rotatably secured by a pivot pin 74 to the front connector bar 48 and positioned proximate the right end 52 thereof. In a similar manner, a second sprocket 76 is rotatably secured to a pivot pin 78 and secured proximate the left end 50 of the front connector bar 48. The sprockets 72 and 76 are spaced equidistantly from the center sprocket 70. A first L-shaped slider crank arm 80 includes an upper end 79 and a lower end 81. The upper end 79 of the crank arm 80 is rotatably secure to the first sprocket 72 while the lower end 81 is rotatably secured to the base portion 62 of the L-shaped wheel bracket 60 on the right end 52 of the front connecter bar 48. A second L-shaped slider crank arm 82 similarly includes an upper end 83 and a lower end 85. In a similar manner, the upper end 83 of the crank arm 82 is rotatably secure to the second sprocket 76 while the lower end 85 thereof is rotatably secured to the base portion 62 of the L-shaped wheel bracket 60 proximate the left end 50 of the front connector bar 48. An endless chain 84 having an inside linking surface 86 and an outside linking surface 88 is positioned around the first and second sprockets 72 and 76 so that the inside linking surface 86 is in contact with the teeth of the sprockets 72 and 76. In this preferred embodiment of the steering mechanism 38, the outside linking surface 88 of the chain 84 is linked to the center sprocket 70 as shown in FIG. 4. The steering mechanism 38 is located entirely above the base portions 62 of the L-shaped wheel brackets 60. This height above the ground level gives adequate clearance so that mud and grass clippings do not reach the endless chain and sprockets of the steering mechanism 38.

Figure 5:
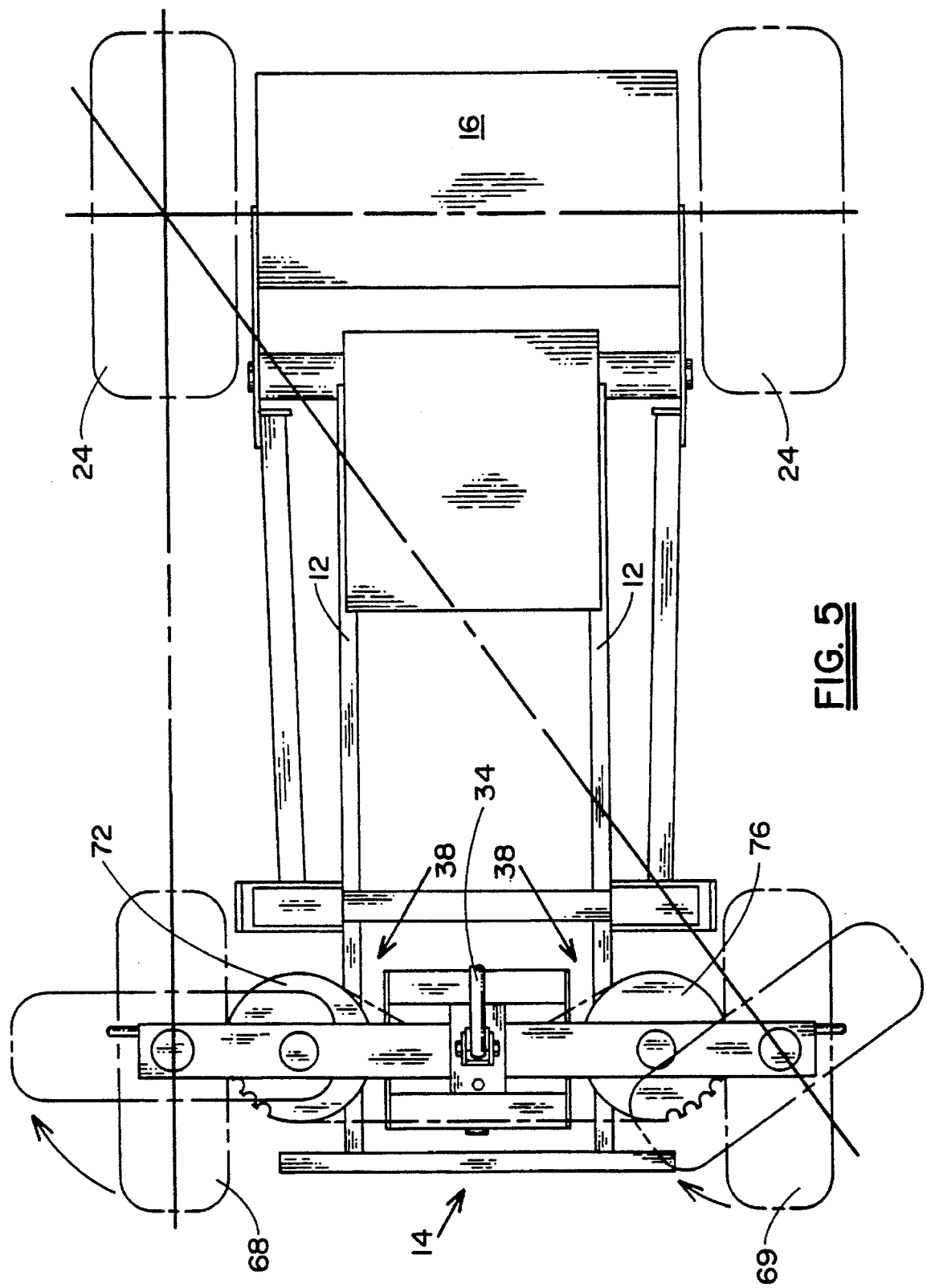
FIG. 5 is a plan view of a riding lawn mower employing the steering mechanism according to the present invention.

FIGS. 3 and 4 show the lawn mower 10 when the front wheels 68 and 69 are in a straight forward alignment. In this straight forward alignment, the upper end 79 of the first crank arm 80 is positioned along a radius of the first sprocket 72 which is, as shown in FIG. 4, an angle of γ degrees from a reference line parallel to a central longitudinal axis of the frame 12 and intersecting the pivot pin 74. In a similar manner, the upper end 83 of the second crank arm 82 is positioned along a radius of the second sprocket 76 which is −γ degrees from a reference line parallel to the central longitudinal axis of the frame 12 and passing through the pivot pin 78. Thus with the described arrangement of the present steering assembly, when the steering wheel 36 is turned to the right, the central sprocket 70 will rotate causing the first sprocket 72 to rotate from the angle γ to an increasingly larger angle while the second sprocket 72 rotates from −γ to zero and then therethrough to an increasing angle as the steering wheel 36 is caused to turn further. In this manner, when the left front wheel 69 is 45 degrees relative to its parallel reference line, the right front wheel 68 will be 90 degrees relative to its parallel reference line as represented in FIG. 5. In a similar manner, when the steering wheel 36 is turned to the left, the orientation of the front wheels 68 and 69 will be reversed from that shown in FIG. 5. In this condition, the right front wheel 68 will be orientated 45 degrees to its reference line while the left front wheel 69 will be orientated at 90 degrees. When the front wheels are turned to the left or to the right as represented in FIG. 5, an axial line through the axle 66 of the front left wheel 69 will intersect an axial line through the axle 66 of the front right wheel 68 along a line collinear with the rear axle 26 as represented in FIG. 5. In this manner, the riding lawn mower 10 is driveable over an arc path that has a radius approximately half the length of the vehicle frame 12. Riding lawn mowers of this type are commonly referred to as zero radius riding lawn mowers or simply, zero turns.

While this invention has been described in detail with reference to a certain preferred embodiment, it should be appreciated that the present invention is not limited to that precise embodiment. Rather, in view of the present disclosure which describes the best mode for practicing the invention, many modifications and variations would present themselves to those of skill in the art without departing from the scope and spirit of this invention, as defined in the following claims.

What is claimed is:

1. A riding lawn mower comprising:

a vehicle frame including a front end, a rear end, and a rear motor deck being secured to said rear end and having a drive motor mounted thereon;

a rear wheel assembly connected to said rear motor deck and engaged with said drive motor, said rear wheel assembly including rear wheels and a rear axle that provide drive capability to the lawn mower;

a front wheel assembly connected to the front end of said vehicle frame, said front wheel assembly including front wheels that provide steering capability to the lawn mower, said front wheel assembly further including a front connector bar having a first end and a second end, said front connector bar being fixedly secured to the front end of said vehicle frame and positioned substantially perpendicular thereto, each end of said front connector bar extending beyond said vehicle frame, a downwardly directed bearing cylinder located at each end of said front connector bar, each of the bearing cylinders including a first cylindrical member fixedly secured to a respective end of the connector bar, and a second cylindrical member rotatably secured within said first cylindrical member, an L-shaped bracket being secured to each of the second cylindrical members and having a base portion and a leg portion, the base portion of each of said L-shaped brackets fixedly secured to a respective second cylindrical member with the leg portion directed downwardly therefrom, and a wheel axle extending outwardly from the bottom of the leg portion of each of said L-shaped brackets, each of said wheel axles rotatably secured to a respective front wheel;

an operator's seat secured to the lawn mower to position an operator of the mower in a desired position;

a steering column being cooperatively connected at one end to said front wheel assembly and including at the other end thereof a steering wheel positioned within reach of the operator of the lawn mower to control said from wheel assembly; and steering means positioned above the front wheels of the mower and linked between the one end of said steering column and said front wheel assembly, said steering means for turning the front wheels asynchronously by operation of said steering wheel so that the lawn mower is movable along an arc path having a radius approximately half the length of said vehicle frame.

2. The riding lawn mower according to claim 1 wherein said steering column is secured into said front connector bar at approximately a mid-point thereof and said steering means includes:

a center sprocket secured to said one end of said steering column;

a first sprocket rotatably secured to said front connector bar a predetermined distance from the mid-point thereof and positioned proximate said first end of the connector bar;

a second sprocket rotatably secured to said front connector bar said predetermined distance from the mid-point thereof and positioned proximate said second end of the connector bar, said first and second sprockets thereby being oppositely opposed along the connector bar and equidistant from said center sprocket;

a first L-shaped slider-crank arm rotatably secured at one end to said first sprocket and rotatably secured at the other end to the base portion of the L-shaped bracket proximate thereto;

a second L-shaped slider-crank arm rotatably secured at one end to said second sprocket and rotatably secured at the other end to the base portion of the L-shaped bracket proximate thereto; and endless chain means having an inside linking surface and an outside linking surface, the inside surface of said endless chain means linked around said first and second sprockets and said center sprocket linked to the outside surface of the chain means.

3. The riding lawn mower according to claim 2 wherein said first L-shaped slider-crank arm is secured to said first sprocket at a point along a predetermined radius thereof and said second L-shaped slider-crank arm is secured to said second sprocket at a point along a predetermined radius thereof so that an axial line through the axle of one of the front wheels intersects an axial line through the axle of the other front wheel along a line collinear with said rear axle when said front wheels are turned away from straight forward alignment.

4. The riding lawn mower according to claim 2 wherein said first L-shaped slider-crank arm is secured to said first sprocket at a point along a predetermined radius thereof and said second L-shaped slider-crank arm is secured to said second sprocket at a point along a predetermined radius thereof so that when said steering column is rotated in one direction through a first predetermined number of degrees, one of said front wheels turns through a second predetermined number of degrees while the other front wheel turns through a third predetermined number of degrees.

5. The riding lawn mower according to claim 2 wherein said first L-shaped slider-crank arm is secured to said first sprocket at a point along a predetermined radius thereof and said second L-shaped slider-crank arm is secured to said second sprocket at a point along a predetermined radius thereof so that when said steering column is rotated in one direction through a predetermined number of degrees, one of said front wheels turns through approximately ninety degrees while the other front wheel turns through approximately forty-five degrees.

6. The riding lawn mower according to claim 5 wherein when said steering column is rotated in the other direction through said predetermined number of degrees, said one of said front wheels turns through approximately forty-five degrees while said other front wheel turns through approximately ninety degrees.

* * * * *